Figures 1, 2:
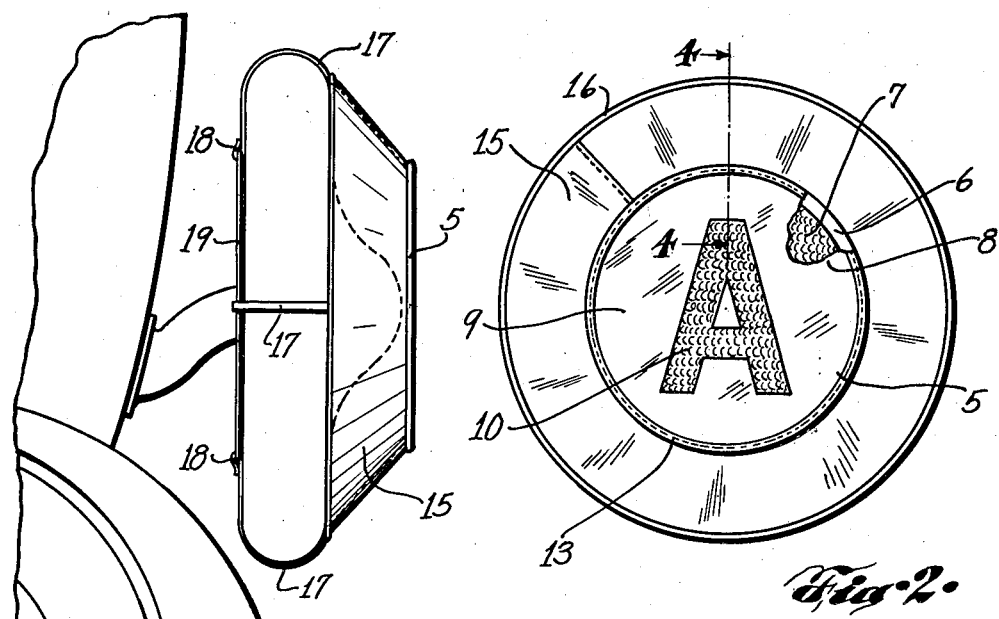

Nov. 20, 1934.    W. L. FUCHS    1,981,227
DISPLAY DEVICE
Filed Feb. 26, 1934

INVENTOR.
William L. Fuchs

Patented Nov. 20, 1934

1,981,227

UNITED STATES PATENT OFFICE 1,981,227

DISPLAY DEVICE

William L. Fuchs, St. Louis, Mo.

Application February 26, 1934, Serial No. 712,921

4 Claims. (Cl. 40—129)

This invention relates to display devices, advertising signs and the like, and more particularly to improved signs which are adapted to be mounted on spare tires such as are usually carried by automotive vehicles.

For the past number of years covers for spare tires have been extensively used as advertising media, signs or other displays being painted, printed or otherwise formed on the tire covers.

Signs of so-called light reflecting type have come into particular prominence for this service, partly by reason of their attractiveness and effectiveness at night as well as day, but especially because when located at the rear of automobiles such signs are in excellent position for illumination by reflected rays which have their source at following vehicles. Further, a light reflecting sign, when mounted on the rear of an automobile, performs a service other than that of merely advertising, in that it serves in a measure as a safety or warning signal in the event that the rear or tail light becomes inoperative, or in the event that the automobile becomes stalled without lights on a highway.

At the present time the metal tire cover has, to an appreciative extent, displaced the fabric tire cover. The metal cover of prevailing design is not well adapted for the reception of signs or display devices because of the irregular surface and protruding hub portion thereof. Fabric covers when used on spare wheels of wire spoke type are likewise unsatisfactory for sign bearing purposes by reason of the protruding hub which causes a bulge in the side panel of the cover. Obviously a flat display surface is desirable for practically all types of signs, but for light reflecting signs the character of the display surface is of extraordinary importance. This may be readily understood when it is considered that the image produced in a light reflecting sign, as in the case of a mirror, will be distorted when the reflecting surface does not lie substantially in a plane. Reflecting signs of the type most frequently employed on tire covers are flexible, and experience has taught that these signs lose much of their effectiveness when they are caused to bend, wrinkle or bulge.

An object of the present invention is to provide an improved display device or sign which is especially adapted to be mounted on a spare tire, tire cover or spare wheel of an automobile.

Another object is to provide an improved light reflecting sign of flexible construction, having a peripheral flange or skirt for the purpose of spacing the sign panel from the object to which it is secured, and thereby to prevent bending, wrinkling and bulging of the sign panel.

Other objects and advantages will hereinafter appear.

Figure 3:
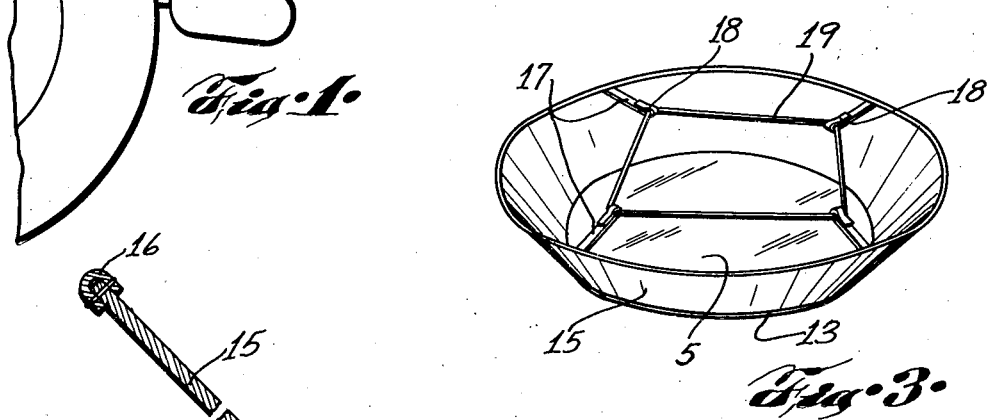
Figure 4:
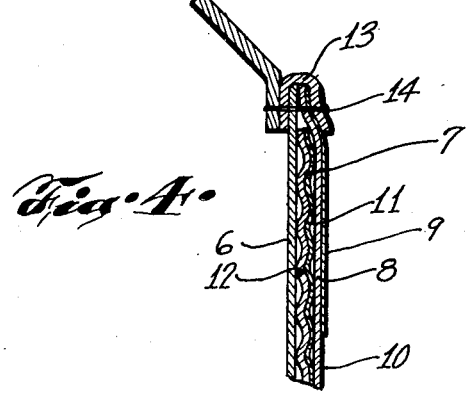

In the drawing, Fig. 1 is a side elevational view of the device of my invention as applied to a metal spare tire cover; Figs. 2 and 3, respectively, are plan and perspective views of the device of my invention, and Fig. 4 is a fractional sectional view taken at the line 4—4 of Fig. 2.

Referring to the drawing by numerals of reference, 5 designates the display, or sign panel generally, and in the present example comprises a backing sheet 6, of card-board or other suitable material, an element 7 having a light reflecting surface, and a sheet of celluloid 8 having opaque portions 9 and translucent portions 10 in the shape of a character, or trade-mark indicia to be displayed. The reflecting element 7, (Fig. 4), consists of a sheet of metal foil 11, cemented to a card-board member 12, the composite member being embossed or otherwise formed to provide a multiplicity of evenly distributed bosses. The use and purpose of the embossed reflecting member is well known in the art. Briefly, however, the bosses serve to disperse the light rays and to increase the range or zone in which light rays from an external source are effective to "bring out" the characters. The panel 8 is preferably formed from colored celluloid, the opaque or backgrounding portion 9 thereof being produced by a layer of dull paint of color which contrasts markedly with the original color of the celluloid.

The elements 6, 7 and 8 are preferably circular as shown, but may be polygonal or of any other desired shape. These elements are united as by means of the binding tape 13 and stitches 14. It is my present preference to form the reflecting element of reduced size as compared to the elements 6 and 8, (Figs. 2 and 4), so that the stitches 14 will not pass through the element 7. This construction permits of certain independent limited movement of the element 7, increasing the flexibility and durability of the panel. While I have described a display panel of particular construction, the invention is not limited to the particular form or construction herein described. For example the panel 5 may be produced without a celluloid element, such as is described in the copending application of Edward L. Fuchs, Serial No. 707,097, filed January 18, 1934.

Secured to the edge of the display panel 5, preferably by stitching, is a tubular member or flange 15. The member 15 is formed of heavy cardboard or other substantially rigid sheet material having the requisite properties of strength and durability, and by preference is in the form of hollow truncated cone. By the provision of a conical flange member the device is well adapted to fit all sizes of tires, tire covers or wheels now in general use. If desired the outer marginal edge of member 15 may be provided with a protective tape binding 16. Suitable means are provided for attaching the device as above described to a tire, tire cover or wheel. In the present example such means include a series of regularly spaced flexible straps 17, each of which is secured at one end to the outer margin of the flange 15. The free ends of the straps 17 are provided with loops 18, and an elastic band 19 extends through such loops.

From the foregoing description it will appear that the device may be readily applied to or removed from the spare wheel or tire; that the display panel is maintained in its normal plane, suitably spaced from projecting portions of the wheel or tire cover, which, with prevailing types of sign mountings, tend to produce a bulge or wrinkle in the display panel.

I claim as my invention:

1. A display device adapted to be mounted on an automobile spare tire or wheel, comprising a display panel a peripheral flange projecting angularly from the plane of said display panel, and a resilient band secured to the outer end of said flange for removably securing the same to a spare tire or wheel.

2. A device of the class described, comprising a tubular member, a display panel extending across one end of said tubular member, and means at the other end of said tubular member for securing said member to a spare tire or wheel said means comprising a plurality of flexible straps, and an elastic band engaging said straps.

3. A device of the class described, comprising a tapered tubular member, a display panel extending across the small end of said member, and means for fastening the other end of said member to a spare tire or wheel, said means comprising a plurality of flexible straps secured to said member, and an elastic band engaging said straps.

4. An advertising sign adapted for mounting on the spare tire or spare wheel of an automobile, comprising a tubular member of tapered diameter, a sign panel of light reflecting type secured to, and extending across the small end of said member, and means for securing said member and sign panel to a spare tire or wheel, comprising a plurality of flexible straps secured individually to, and spaced circumferentially around the large end of said member, and an elastic band engaging the free ends of said straps.

WILLIAM L. FUCHS.